Mar. 13, 1923.  
G. J. LENZ  
1,448,277
LOCKING MEANS
Filed Dec. 15, 1921
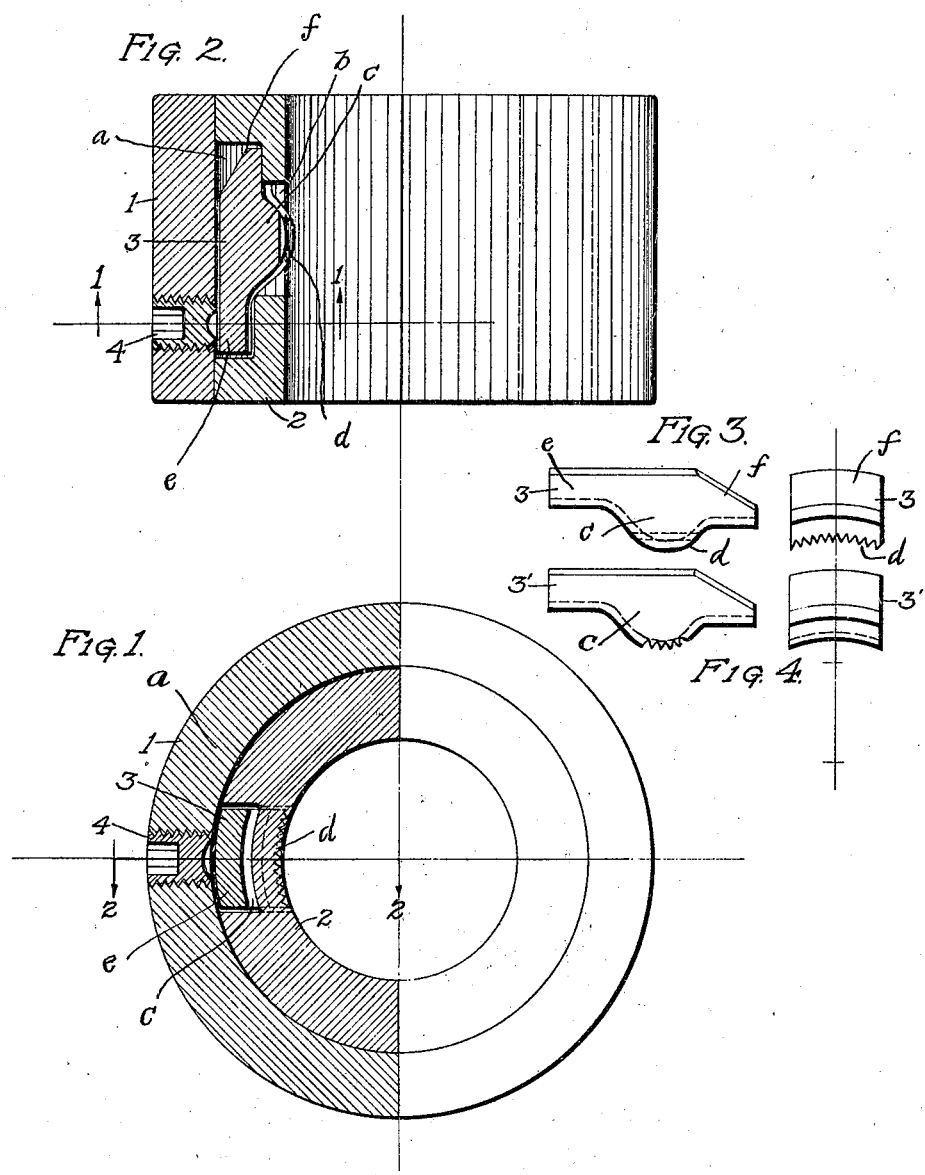
INVENTOR.  
George J. Lenz  
BY Frank O. Parker  
ATTORNEYS.

Patented Mar. 13, 1923.

1,448,277

UNITED STATES PATENT OFFICE.

GEORGE J. LENZ, OF GREEN BAY, WISCONSIN.

LOCKING MEANS.

Application filed December 15, 1921. Serial No. 522,509.

*To all whom it may concern:*

Be it known that I, GEORGE J. LENZ, a citizen of the United States, residing at Green Bay, in the county of Brown and State of Wisconsin, have invented certain new and useful Improvements in Locking Means, of which the following is a specification.

The invention relates to a locking device, and more particularly to the class of fastening means for collars, pulleys, gears or the like.

The primary object of the invention is the provision of a fastener of this character, wherein two parts, one being engaged or telescoped over the other can be securely locked together, so as to avoid any possibility of the slipping thereof relative to each other, or the working loose of either part, so that one will work out of its selected position with respect to the other, thereby enabling the said parts to be firmly held engaged together, irrespective of vibrations, shocks or jars and motion imparted thereto.

Another object of the invention is the provision of a fastener of this character, wherein maximum leverage is had upon the looking element due to the novel form of the latter and the mounting of the same in a part, when engaged upon another part, so that said parts in their assembled relation can be firmly and rigidly made fast to each other, and in this manner avoiding the use of the usual set screws, splines or keys.

A further object of the invention is the provision of a fastener of this character, wherein the locking part may be made with a smooth or serrated gripping face or surface, as the occasion may require, and when engaged with interfitted parts will positively hold the same securely together, the fastener being designed for use with collars, pulleys, gears, nuts, or the like parts.

A still further object of the invention is the provision of a fastener of this character, which is extremely simple in construction, thoroughly reliable and efficient in its purpose, strong, durable, and inexpensive to manufacture and install.

With these and other objects in view, the invention consists in the features of construction, combination and arrangement of parts, as will be hereinafter fully described, illustrated in the accompanying drawing, and pointed out in the claims hereunto appended.

In the accompanying drawing:

Figure 1, is an end elevation partly in section of a safety collar, showing the fastener constructed in accordance with the invention mounted in position therein for engagement with a shaft.

Figure 2, is a plan view partly in section.

Figure 3, shows side and end elevations of the locking element removed from the collar.

Figure 4, is a view similar to Figure 3, showing a slight modification of the locking element.

Similar reference characters indicate corresponding parts throughout the several views in the drawing.

Referring to the drawing in detail, 1 and 2, designate outer and inner sleeves or collars, respectively, which are firmly fitted together, the outer collar or sleeve being telescoped over the inner collar or sleeve, although the same may be otherwise assembled relative to each other. It is to be understood that the inner collar or sleeve 2, is to be engaged upon a shaft (not shown).

Formed in the inner collar or sleeve 2, in a longitudinal direction is an elongated recess *a*, which opens through the outer periphery thereof, while medially of this recess is a slot *b*, which opens through the inner periphery of said collar or sleeve, for a purpose presently described.

Loosely fitted within the recess *a*, is a fastener or locking element 3, in the form of an elongated dog or pawl, having an intermediate rocker portion forming a gripping cam *c*, which is adapted to protrude through the slot *b*, for engagement with a shaft (not shown), the cam *c*, being provided with serrations *d*, disposed in this instance longitudinally thereof, to enable a firm and secure grip or biting engagement with the shaft on the manipulation of the dog or pawl in a manner hereinafter described.

The outer collar or sleeve 1, closes the recess *a*, at the area where it opens through the outer periphery of the inner collar or sleeve 2, and tapped or otherwise adjustably engaged in the outer collar or sleeve 1, is a plug 4, which is located relative to the dog or pawl 3, to play upon the heel end *e*, thereof, while the opposite toe end *f*, of said dog or pawl is beveled at the outer side, to permit the required rocking movement of the dog or pawl 3, upon the cam *c*, when the plug 4, is adjusted in the outer collar, for the release or locking of the inner collar or sleeve 2, as will be clearly apparent. The location of the plug 4, with respect to the heel end of the dog or pawl 3, enables maximum leverage of force to be applied to the locking element and thereby assuring a positive and secure fastening of the collar or sleeve 2, upon a shaft.

In Figure 4, of the drawing there is shown a slight modification of locking element, wherein the dog or pawl 3', has the serrations formed transversely thereof, in contradistinction to the longitudinal serrations $d$, in the dog or pawl 3, hereinbefore described. It is to be understood that the locking element may be of any shape as should be required in the application and use of the fastener with variable characters of parts, and aside from this, the cam $c$, can be disposed at any point intermediate of the dog or pawl, to accomplish the perfect working of the locking element.

When the plug 4, is worked inwardly of the collar or sleeve 1, it engages the dog or pawl 3, causing the latter to rock upon the cam $c$ for the positive biting engagement of the serrations $d$, in a shaft, thereby firmly securing the inner collar or sleeve 2, thereon.

What is claimed is:

1. The combination with a member for engagement upon a part, of a locking element, the member being constructed and arranged to receive the locking element, a gripping cam portion on the latter for contact with the part and adapted to bind the same when leverage is applied to said element, and adjustable means carried by the member to actuate the element.

2. The combination with interfitted members, of a locking element, the innermost member being formed with a recess to receive the element, a gripping portion on the latter and working through the innermost member, to engage a part to which the member is to fastened, one portion of the element being cut away to allow rocking movement thereof in the recess, means for adjusting the element to bring the same into locking position, and serrations on the gripping portion of the locking element.

3. The combination with members, one to be fitted upon the other, of locking means for the members including a dog having a cam portion intermediate its ends and loosely fitted in one of the members with its cam portion exposed for gripping engagement with a support, and a plug carried by the other member to act upon the dog for moving its cam portion into gripping relation with the support.

4. The combination with members, one to be fitted upon the other, of locking means for the members including a dog having a cam portion intermediate its ends and loosely fitted in one of the members with its cam portion exposed for gripping engagement with a shaft, and a plug carried by the other member to act upon the dog for moving its cam portion into gripping relation with the shaft, the dog being constructed and arranged for fulcrum action upon the members.

In testimony whereof, I affix my signature, in the presence of two witnesses.

GEORGE J. LENZ.

Witnesses:
F. H. WIRTZ,
OLIVIA WEBER.